United States Patent [19]

Abu-Samra et al.

[11] 4,080,168

[45] Mar. 21, 1978

[54] METHOD AND APPARATUS FOR THE WET DIGESTION OF ORGANIC AND BIOLOGICAL SAMPLES

[75] Inventors: Adel Abu-Samra, Irvine, Calif.; Samuel R. Koirtyohann; John S. Morris, both of Columbia, Mo.

[73] Assignee: The Curators of the University of Missouri, Columbia, Mo.

[21] Appl. No.: 659,141

[22] Filed: Feb. 18, 1976

[51] Int. Cl.[2] .............................. B01J 3/00; B01J 7/00

[52] U.S. Cl. ................................ 23/230 R; 23/230 B; 23/259; 23/292; 23/290.5

[58] Field of Search ...................... 23/259, 292, 290.5, 23/230 R, 253 PC, 230 B

[56] References Cited

U.S. PATENT DOCUMENTS 3,020,130 2/1962 Ferrari .............................. 23/230 R
3,178,265 4/1965 Ferrari .............................. 23/230 R
3,467,500 9/1969 Wilkinson et al. ............... 23/230 R

*Primary Examiner*—R.E. Serwin

[57] ABSTRACT

A rapid, safe and efficient process for the digestion and destruction of organic matter in materials of biological origin. Acid mixtures (nitric and perchloric acids for ashing; appropriate acid mixtures for other digestions) are added to the sample and then heated internally by absorption of microwave energy from a precisely controlled field within a specially modified microwave oven.

Apparatus used for the digestions include a microwave oven equipped with an internal, acid-fume resistant box or liner, a positive flow ventilation system through the box, and an acid-fume trap or scrubber for treating the exhaust fumes from the box. Additional apparatus includes a precise timing system for controlling the delivery of microwave energy, or an interrupted duty cycle timing system.

7 Claims, 3 Drawing Figures

METHOD AND APPARATUS FOR THE WET DIGESTION OF ORGANIC AND BIOLOGICAL SAMPLES

BACKGROUND OF THE INVENTION

1. Field of the Invention

This invention relates generally to the field of analytical chemistry, and more specifically to a method and apparatus for the digestion of organic matter prior to analysis. Apparatus used in the method includes a specially designed microwave oven system for containing and treating acid fumes evolved and for controlling precisely the rate at which such digestion occurs.

2. Description of the Prior Art

Numerous processes for the digestion of organic matter prior to metals or nitrogen analyses are known in the art. The problems associated therewith are also well known. Wet ashing processes and problems are described most comprehensively by T. T. Gorsuch in The Analyst, (1959), and in his book entitled: "The Destruction of Organic Matter", Pergamon Press, New York, New York, 1970. The Kjeldahl digestion has been discussed comprehensively in the book by R. B. Bradstreet entitled: "The Kjeldahl Method for Organic Nitrogen", Academic Press, N.Y., 1965.

The "wet ashing" methods have gained greatest acceptance among investigators interested in trace metals analyses, and the Kjeldahl digestion is almost universally used prior to nitrogen determinations. The wet digestion methods suffer from the disadvantages of requiring close and constant operator attention, the need for special hoods to handle the acid fumes (especially perchloric acid) safely, and the danger of explosion if established procedures are not strictly followed. Also, in certain cases where speed is required, such as in neutron activation analysis, the elapsed time can also be a limitation.

The primary advantage of utilizing the present invention is the speed with which the digestion can be carried out. Ashings which normally require 1 - 2 hours with nearly constant operator attention can be done in 5 - 15 minutes with little or no operator attention.

Microwave ovens for the cooking of foods are well known in the art, as typified by the patent to Hall, U.S. Pat. No. 2,500,676, entitled: HEATING APPARATUS. Such ovens for cooking have also been designed with flow-through ventilation systems, as shown in the patent to Javes, et al., U.S. Pat. No. 3,654,417 entitled: MICROWAVE OVEN INCLUDING AIR FLOW SYSTEM.

Microwave energy has also been used for producing and controlling chemical reactions for specific purposes, as shown by the patent to Jacobs, U.S. Pat. No. 3,294,879, entitled: METHOD FOR MAKING POLYURETHANE FOAM.

None of the apparatus described above, or related thereto are designed for the destruction of organic matter, and particularly, no existing microwave apparatus is known that is capable of withstanding the corrosive environment created by the corrosive acid fumes generated in the digestion processes.

SUMMARY OF THE INVENTION

It is an object to provide an improved method and apparatus for the rapid and efficient digestion of samples of organic materials. The saving of time is important in many digestion applications, but with neutron activation analysis — using short lived isotopes — it is especially valuable.

Additional advantages of the method include:

1. Safety — bumping and frothing are virtually eliminated, and the samples are enclosed within the inner container, if an accident should occur.
2. The need for special perchloric acid hoods is eliminated if the acid fumes are trapped.
3. No special glassware is needed.
4. The air intake to the inner container can be easily filtered, greatly reducing the risk of air borne contamination.
5. Multiple samples can be ashed simultaneously.
6. A large variety of sample materials can be ashed, such as: coal, petroleum and related products; fertilizers, feed and soils; and samples for nitrogen analysis or mineral content.

The apparatus used in the process includes a specially designed microwave oven system formed with an acid fume resistant inner sample container or liner, flow-through ventilation system for evacuating acid fumes generated within the inner container, means for trapping and removing the acid fumes evacuated, and timing control means for regulating the delivery of microwave energy to the samples. The latter timing control means can include a pre-set timer, for a given sample size, or an interrupted duty-cycle timer so as to prevent boiling over of the samples.

DETAILED DESCRIPTION OF THE DRAWINGS

Figure 1:
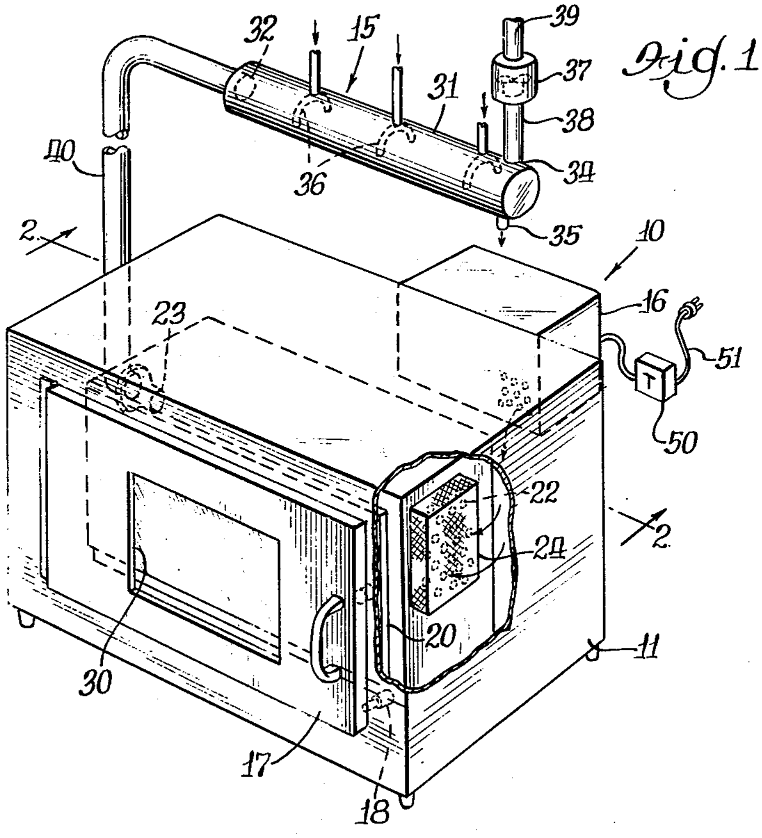
FIG. 1 is a perspective view, partially cut-away, of the microwave oven system utilized in the present invention.
Figure 3:
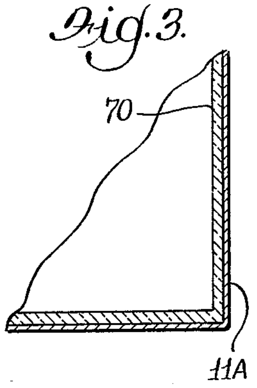
FIG. 3 is a fragmentary sectional view of a modified construction of the microwave oven.
Figure 2:
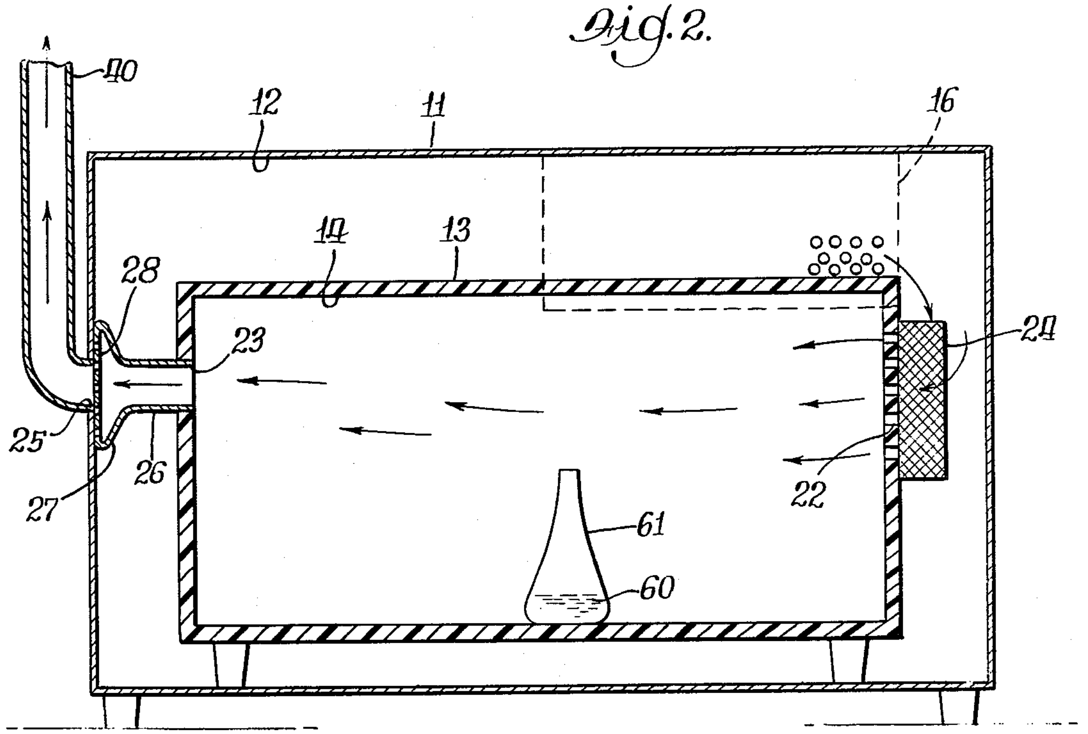
FIG. 2 is a sectional front view, taken on line 2—2 of FIG. 1.

The microwave sample digestion system of the present invention is shown in perspective in FIG. 1 and is designated generally by the numeral 10. The system 10 comprises a rectangular oven box 11 formed with an internal cavity 12, a generally rectangular sample retaining box 13 disposed within the cavity 12 and also formed with an internal cavity 14, and an acid fume scrubber 15. The oven 11 is energized by a conventional magnetron power source 16 (shown in block form in the FIGS.).

The oven box 11 is provided with a conventional front door 17 and an interlock switch 18 for de-energizing the power source 16 when the door 17 is open. The inner sample box 13 is also provided with a hinged door 19 for allowing easy access to the interior 14. The sample box 13 preferably is constructed of glass or plastic material that is acid fume resistant and non-microwave energy absorbing. An acid fume resistant seal 20 is provided between the door 19 and the perimeter of the entry into the box 13.

The sample box 13 is formed at one end with an air inlet port 22 (or plurality of ports), and at an opposite end with an exhaust port 23. A fine mesh filter 24 may be disposed to cover the inlet port 22 to prevent contamination of the interior 14 with incoming air-borne impurities. The oven box 11 is also formed with an exhaust port 25 which is connected to the exhaust port 23 of the sample box 13 by means of a section of tubing 26. The tubing 26 may be made of teflon or other acid fume resistant material and may be bell-mouthed at 27 to accommodate a radiation baffle. The baffle 28 preferably is constructed of perforated stainless steel (of the type used in the observation window 30 of the door 17) and teflon coated to make it acid fume resistant. The baffle 28 is situated so as to cover the port 25 and prevent any microwave radiation leakage therethrough.

The fume scrubber 15 may be of any type suitable for treating the fumes generated within the sample box 13. The scrubber 15 shown is of the water spray type and comprises an elongated cylindrical shell body 31 formed with an inner cavity 32, an inlet port 33, an exhaust port 34, and a drain port 35. A plurality of spray heads 36 are mounted within the shell 31 and are connected externally to a source of water pressure (not shown). An air exhaust fan 37 is mounted above the scrubber 15 and has an inlet 38 connected to the exhaust port 34. The fan 37 also has an exhaust port 39 for venting the treated fumes drawn from the scrubber 15. The inlet port 33 is connected to the exterior of exhaust port 25 through a suitable conduit 40.

An electrical timer 50 may be included in the primary controls for the magnetron power source 16, or may be interposed in the power line 51 leading to the power source 16. The timer 50 may be of the direct time-lapse type or of the interrupted duty-cyle type depending upon the number and types of analyses being made.

In operation, the microwave digestion system 10 is utilized as follows:

A sample 60 is prepared with a suitable acid mixture within a flask 61 and the flask 61 placed within the sample box 13. The doors 19 and 17 are closed, the timer 50 is set, and the microwave power source 16 is energized. The exhaust fan 37 is turned on and the scrubber 15 is actuated.

The microwave energy absorbed by the sample 50 causes it to boil evolving acid fumes which are discharged into the cavity 14. The negative pressure created by the fan 37 withdraws the fumes through the exhaust port 23, tube 26, exhaust port 25 and conduit 40 into the scrubber 15. Air to replace the fumes withdrawn enters through filter 24 and inlet port 22. The spray from the heads 36 cleans the acid fumes by direct contact and the water that accumulates with the cavity 32 is discharged through the drain port 35. The cleaned fumes are withdrawn by the fan 37 through the exhaust port 34 and discharged through outlet port 39. The discharged fumes may be released under an exhaust hood or through some other suitable outlet to atmosphere (not shown).

The negative pressure created by the fan 37 keeps the acid fumes completely contained within the discharge conduits described until properly treated within the scrubber 15 before being released. The microwave oven 11 is therefore effectively isolated from the fumes that are generated, and the fumes are treated before passing through the fan 37. This system therefore minimizes the possibility of corrosion or attack by the acid fumes on exposed surfaces or moving parts. It should be noted that the precise location of the air inlet and exhaust ports in the boxes 11 and 13 is not critical. These may be located in the top and/or the bottom of the boxes, so long as adequate flow-through ventilation is maintained to completely exhaust the fumes.

The microwave digestion system 10 just described has been utilized for the wet ashing of a large number and variety of samples. The sample types have included: hair, orchard leaves, freeze-dried liver, freeze-dried eggs, and fingernails. Most of the ashings were carried out with the samples immersed in a 4:1 mixture of reagent grade nitric and perchloric acids.

The optimum operating conditions for carrying out the wet ashing method of this invention are dependent on a number of parameters. For a predetermined microwave power output, the adjustable parameters include: sample size; number of samples per run; type of container; and kinds, amounts, and ratios of acids used in the digestion mixture. In each case the determinant is the time required to render the sample 60 to a preconceived stage of digestion ranging from partial oxidation with sample dissolution to a complete, fuming perchloric acid oxidized solution.

In the terminology of this application, "digestion" means that the sample taken into solution; "complete ashing" means that the sample is completely oxidized at the fuming perchloric or sulfonic acid stage. The differentiation is necessary in that for certain analytical techniques a sample may need only to be taken into solution (i.e., for radiochemical neutron activation analysis, exchange between carrier and radioisotope occurs on dissolution of the sample — complete perchloric acid ashing is not needed in many cases) whereas for other analytical techniques, complete ashing may be necessary.

The type of sample container 61 is of some importance. Erlenmeyer flasks or test tubes have been found to work better than beakers for ashing. This is apparently due to the increased refluxing action of the nitric acid in the flasks. This presents the organic material with a better oxidizing atmosphere.

The amount of acid mixture used must be adequate for the sample size being digested. We have found that 7ml of the acid mixture approximates the minimum amount for a 0.5g sample and 10ml provides an adequate safety margin against flashing without prolonging the ashing time excessively.

In most conventional microwave ovens, the energy output from the magnetron source is constant and is delivered to the load within the oven. Typically, the maximum power output may be from 600 to 1000 watts. The time required for digestion thus depends on the rate of absorption of the microwave energy, and this in turn depends upon the mass of the sample mixture for a single sample, and the total mass of a number of samples. To prevent the boiling over of the samples, it may be desirable to incorporate an interrupted duty cycle type of timer 50. This would provide an intermittent delivery of microwave energy from the source 16.

Examples of test results obtained using the microwave digestion system 10 are set forth below. Samples of NBS Standard Reference Materials 1571 (Orchard Leaves) and 1577 (Bovine Liver) were ashed and several elements determined by atomic absorption.

TABLE I

Analysis Results of 1571 Orchard Leaves and 1577 Bovine Liver by Atomic Absorption After Microwave Oven Wet Ashing 1571 Orchard Leaves (μg/g)

| | 1 | 2 | 3 | 4 | (ave) | (NBS) (Value) |
|---|---|---|---|---|---|---|
| Pb | 42 | 45 | 45 | 46 | (44) | (45±3) |
| Zn | 27 | 32 | 21 | 22 | (26) | (25±3) |
| Cu | 11.3 | 11.8 | 11.7 | 11.8 | (11.6) | (12±1) |

1577 Bovine Liver (μg/g)

(NBS)

TABLE I-continued

Analysis Results of 1571 Orchard Leaves and 1577 Bovine Liver by Atomic Absorption After Microwave Oven Wet Ashing

| | 1 | 2 | 3 | 4 | (ave) | (Value) |
|---|---|---|---|---|---|---|
| Zn | 132 | 131 | 131 | 131 | (131) | (130±10) |
| Cu | 193 | 194 | 196 | 193 | (194) | (193±10) |

It should be noted that the results presented in TABLE I above agree quite closely with the certified values. Neutron activation analysis was used for the determination of As, Se, Co, Mo, Cr, and Ni in the same reference materials. The results obtained are set forth in TABLE II below.

TABLE II

Analysis Results of 1571 Orchard Leaves and 1577 Bovine Liver by Neutron Activation Analysis After Wet Ashing 1571 Orchard Leaves (μg/g)

| | 1 | 2 | 3 | 4 | 5 | 6 | (ave) | (NBS) (Value) |
|---|---|---|---|---|---|---|---|---|
| As | 8.7 | | 9.3 | | | | (9.0) | (11±3) |
| Cr | 2.0 | | 2.7 | | | | (2.4) | (2.3)* |
| Se | .09 | .06 | .09 | .07 | .06 | .08 | (.08) | (.08±.01) |
| Mo | .22 | | .21 | | | | (.22) | (no value) |
| Ni | 1.4 | | 1.3 | | 1.3 | | (1.3) | (1.3±.2) |

1577 Bovine Liver (μg/g)

| | 1 | 2 | 3 | 4 | 5 | (ave) | (NBS) (Value) |
|---|---|---|---|---|---|---|---|
| As | .04 | .04 | .04 | .05 | .05 | (.04) | (.05)* |
| Se | 1.1 | 1.1 | 1.0 | 1.0 | | (1.0) | (1.1±1) |
| Co | .22 | | | | | (.22) | (.18)* |
| Mo | 3.1 | 3.3 | 3.3 | 3.3 | 3.0 | (3.2) | (3.2)* |

*uncertified

In each case of TABLE II above, a post irradiation radiochemical separation was used after digestion of the sample in the microwave oven. Where certified values are available, the results agree quite closely.

The results obtainable using the method and apparatus of the present invention prove its effectiveness as a new scientific tool in the field of analytical chemistry.

The invention is not to be considered as limited to the embodiment shown and described except insofar as the claims may be so limited. It is to be understood that many changes and modifications may be made without departing from the spirit of the invention.

We claim:

1. A method for the chemical digestion, prior to analysis, of organic samples comprising the steps of:

providing a modified microwave oven formed with an acid fume resistant sample receiving box disposed within the oven, a flow-through ventilation fume exhaust system, and a timer for controlling the delivery of microwave energy to a sample;

providing an acid resistant, non-microwave absorbent sample container;

placing a pre-determined weight of sample to be digested within the sample container;

adding a volume of acid mixture to the container in proportion to the pre-determined sample weight;

placing the prepared sample mixture and container within the sample receiving box;

setting the timer and energizing the microwave oven so as to produce a pre-determined degree of digestion of the sample.

2. The method of claim 1 wherein:

the acid mixture is added in the proportion of 7 to 10ml. for each 0.5g of sample weight.

3. The method of claim 1 wherein:

the acid mixture for sample digestion is a 4:1 mixture of reagent grade nitric and perchloric acids.

4. Apparatus for the chemical digestion of organic sample materials comprising:

a microwave oven generally in the form of a rectangular box and having a source of microwave energy;

an acid fume resistant sample receiving box disposed within said microwave oven; and means defining a flow-through ventilation system through said oven and through said sample receiving box.

5. The apparatus of claim 4 including:

suction means for creating a negative pressure within said sample receiving box for thereby withdrawing acid fumes generated during the chemical digestion of sample material when heated from said source of microwave energy.

6. The apparatus of claim 5 including:

a fume scrubber means interconnected between said sample box and said suction means for treating the acid fumes exhausted from said sample box.

7. The apparatus of claim 4 including;

timing means interconnected with said source of microwave energy for controlling and limiting the delivery of microwave energy to a sample so as to obviate the boiling over of a sample mixture.

* * * * *